United States Patent
Bayesteh et al.

(10) Patent No.: US 12,196,845 B2
(45) Date of Patent: Jan. 14, 2025

(54) SYSTEMS AND METHODS FOR LOCATING USER EQUIPMENT IN A WIRELESS NETWORK

(71) Applicants: Alireza Bayesteh, Ottawa (CA); Keyvan Zarifi, Ottawa (CA); Mohammadhadi Baligh, Ottawa (CA); Navid Tadayon, Kanata (CA)

(72) Inventors: Alireza Bayesteh, Ottawa (CA); Keyvan Zarifi, Ottawa (CA); Mohammadhadi Baligh, Ottawa (CA); Navid Tadayon, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 16/835,852

(22) Filed: Mar. 31, 2020

(65) Prior Publication Data
US 2021/0302561 A1    Sep. 30, 2021

(51) Int. Cl.
*G01S 13/42*    (2006.01)
*G01S 5/02*     (2010.01)
(Continued)

(52) U.S. Cl.
CPC .............. *G01S 13/42* (2013.01); *G01S 5/0273* (2013.01); *G01S 7/006* (2013.01); *G01S 13/765* (2013.01); *G01S 13/876* (2013.01)

(58) Field of Classification Search
CPC .......... G01S 13/42; G01S 5/00; G01S 13/765; G01S 13/876
See application file for complete search history.

(56) References Cited

U.S. PATENT DOCUMENTS

2005/0227703 A1* 10/2005 Cheng ................... H04W 64/00
                                                    455/456.1
2008/0122695 A1    5/2008 Wang et al.
(Continued)

FOREIGN PATENT DOCUMENTS

WO      2019084946 A1      5/2019
WO  WO-2020067840 A1 *    4/2020  ........... G01S 5/0257

OTHER PUBLICATIONS

Title={Adaptive Beamforming Design for mmWave RIS-Aided Joint Localization and Communication}, author={Jiguang He and Henk Wymeersch and Tachporn Sanguanpuak and Olli Silven and Markku Juntti}, year={2019}, (Year: 2019).*
(Continued)

*Primary Examiner* — Timothy A Brainard
*Assistant Examiner* — Ismaaeel A. Siddiquee

(57) ABSTRACT

Methods and apparatus are provided that may simplify and enhance the location of nodes in a network, including ED and mobile TPs, even if all or many of the nodes are mobile. The methods may be used to enable single TP positioning, and may be used to reduce synchronization error. The provided methods make use of smart reflectors having known location. By processing a combination of signals, which may include an original transmitted signal, and/or one or more reflected signals, the location of a receiving node can be determined. Media tagging may be employed to allow a receiver to detect the identity of the nearby reflectors (with known locations) and based on the identity determine the locations of the reflectors. Using this information, the receiving node can detect its location regardless of knowing the transmission source and/or location.

21 Claims, 12 Drawing Sheets

(51) Int. Cl.
G01S 7/00 (2006.01)
G01S 13/76 (2006.01)
G01S 13/87 (2006.01)

(56) References Cited

U.S. PATENT DOCUMENTS

| | | | |
|---|---|---|---|
| 2011/0205130 A1* | 8/2011 | Mrstik | H01Q 21/0018 343/703 |
| 2016/0054440 A1* | 2/2016 | Younis | G01S 13/867 342/55 |
| 2017/0082729 A1 | 3/2017 | Bar-Shalom | |
| 2019/0181920 A1* | 6/2019 | Rofougaran | H04B 7/022 |
| 2019/0363447 A1* | 11/2019 | Pelletti | H01Q 1/007 |
| 2020/0072939 A1 | 3/2020 | Yamada et al. | |
| 2020/0145977 A1* | 5/2020 | Kumar | H04L 5/0048 |

OTHER PUBLICATIONS

Title={3D Beamforming in Reconfigurable Intelligent Surfaces-assisted Wireless Communication Networks}, author={S. Mohammad Razavizadeh and Tommy Svensson}, year={2020}, eprint={2001.06653}, (Year: 2020).*

Title={Exploiting Randomly-located Blockages for Large-Scale Deployment of Intelligent Surfaces}, author={Mustafa A. Kishk and Mohamed-Slim Alouini}, year={2020}, eprint={2001.10766}, (Year: 2020).*

Title={Radio Localization and Mapping with Reconfigurable Intelligent Surfaces}, author={Henk Wymeersch and Jiguang He and Benoît Denis and Antonio Clemente and Markku Juntti}, year={2019v1}, (Year: 2019).*

Di Renzo, Marco et al. "Smart radio environments empowered by reconfigurable AI meta-surfaces: an idea whose time has come", EURASIP Journal on Wireless Communications and Networking (2019) 2019:129, pp. 1-20.

Fischer, Sven, "Observed Time Difference of Arrival (OTDOA) Positioning in 3GPP LTE", Jun. 6, 2014, pp. 1-62.

Intel Corporation et al., "Potential RAT Dependent Techniques for NR Positioning", 3GPP TSG RAN WG1 Meeting #95 Spokane, USA, Nov. 12-16, 2018, R1-1812519, total 16 pages.

ZTE, "Enhancement for DL-TDOA positioning method", 3GPP TSG RAN WG2#105bis, R2-1903678, 3GPP, Mar. 29, 2019, 6 pages.

* cited by examiner

SYSTEMS AND METHODS FOR LOCATING USER EQUIPMENT IN A WIRELESS NETWORK

FIELD

The application relates generally to wireless communications, and more specifically to systems and methods for locating user equipment (UE) or other nodes within a wireless network.

BACKGROUND

The current positioning practice to locate (i.e. determine the location of) an Electronic Device (ED) within a wireless network is to locate the ED in the global coordinate system (GCS) with respect to a set of reference points of the environment having fixed location in the same GCS. The locations of transmit points (TP), for example base stations, can function as reference points.

The locating problem is solved by using equations that rely on the locations of the reference points. Where a TP functions as a reference point, each transmission from the TP is a source of information which potentially provides one independent equation for use in calculating the location of the ED.

In 6G, the TPs are not necessarily stationary due to the introduction of mobile TPs, such as drones, unmanned aerial vehicles (UAVs) and the like. This means that there are more "unknown locations" to solve for and hence more equations are needed.

Currently, locating an ED involves reception, processing and measurement at the ED, and involves multiple TPs transmitting a positioning reference signal (PRS). An issue with this approach is that any mismatch in the synchronization, oscillator frequency or phase shift of the TPs can significantly impact the positioning accuracy. On the other hand, active positioning using a single TP is not possible due to insufficient information.

Improved systems and methods are needed to facilitate locating the EDs in wireless networks, for example in wireless networks that feature insufficient fixed location TPs, for example due to the inclusion of mobile TPs.

SUMMARY

Methods and apparatus are provided that may simplify and enhance the location of nodes in a network, including ED and mobile TPs, even if all or many of the nodes are mobile.

According to an aspect of the present disclosure, a method is provided for locating a receiving node, hereinafter a referred to as a first node. The method involves receiving by the first node, a first reflected reference signal which is a reference signal after having been reflected by a first reflector. The first node makes a measurement on the first reflected reference signal. The first node obtains a location of the first reflector and determines a location of the first node based on the location of the first reflector and the measurement on the first reflected reference signal.

In some implementations of the aspect of the present disclosure, the first node may be an electronic device such as a user equipment, or a network device such as a transmit point, or more generally, any apparatus having a processor and memory configured to implement the method.

In some implementations of the aspect of the present disclosure, the provided methods may make use of reflectors having known location. By processing a combination of signals, which may include an original transmitted signal, and/or one or more reflected signals, the location of a receiving node can be determined. In some embodiments, media tagging is employed to allow a receiving node to detect the identity of the nearby reflectors (with known locations) and based on the identity determine the locations of the reflectors. Using this information, the receiving node can detect its location regardless of knowing the transmission source and/or location.

Optionally, some embodiments make use of reflectors that are reconfigurable intelligent surfaces (RIS). These can be configured to apply a tag to the reflected signal which can then be used to identify the reflector. The identity can be associated with the location of the reflector for example using a look up table. The look up table may comprises a respective location for each tag. In an implementation, the first node may look up the location of the first reflector in accordance with a tag applied to the reference signal. An advantage of this approach is that the receiving device does not need to know before hand which reflector is reflecting the signal, but rather can determine this by processing the reflected signal.

In some embodiments, the provided approaches may allow the location of ED to be determined, even when being serviced by mobile TPs, by relying on locations of the reflectors.

In some implementations of the above implementations and/or the aspect, possible measurements include a power and/or delay measurement. Alternatively, the first node may transmit the measurements to another node, such as a network device, and it is the network device that determines the location of the first node.

In some embodiments, the node being located, namely the first node, also transmits the reference signal. In this case, wherein making the measurement on the first reflected reference signal may involve determining a delay between transmitting the reference signal and receiving the first reflected reference signal.

Various aspects relate to methods of locating the receiving node performed by the receiving node, where the receiving node is a network device or an electronic device such as a user equipment.

Other aspects relate to an apparatus, such as a network device or an electronic device, that is configured to implement one or more of the methods summarized herein.

The methods may be used to enable single TP positioning. With single TP positioning, a signal from one TP is used to locate the node. The node makes use of signal directly received from the TP, and also makes use of the same signal having been reflected off a reflector having a known location. Compared to systems that rely on signals transmitted from multiple TPs that are independently generated, the provided approach may be used to reduce or eliminate synchronization error. This is because the two signals used to locate the node, namely the directly received signal and the reflected signal are by definition completely synchronized since they come from the same source. In contrast, there may be synchronization mismatch, oscillator frequency mismatch etc. when using signals from different TPs.

In some implementations, a map of the environment is not needed, although if a map is available, such can be used to further enhance the accuracy of the provided methods compared to methods requiring time/frequency synchronization between transmission and reception nodes. In addition, the provided methods may be more immune against system-induced noise that has the potential to cause severe deterioration in location accuracy In some embodiments, the network transmits, and the first node receives, signalling to configure one or more aspects of the reference signal, and/or information about the reflectors, such as their location and tags. For example, the first node may receive signalling to configure or instruct one or more of: reference signal bandwidth; reference signal waveform; reference signal length; reference signal sequence; signature sequence design and length for tags; or lookup table mapping tags to corresponding locations.

According to another aspect of the present disclosure, in an embodiment, there is provided an apparatus comprising: a non-transitory memory comprising instructions; and one or more processors in communications with the non-transitory memory, wherein the one or more processors are configured to execute the instructions to perform a method of any of the disclosed embodiments or aspects.

According to another aspect of the present disclosure, there is provided a computer readable medium having computer executable instructions stored thereon that when executed by a processer perform a method of any of the disclosed embodiments or aspects.

According to another aspect of the present disclosure, in an embodiment, there is provided an apparatus comprising units or means for performing perform a method of any of the disclosed embodiments or aspects.

According to another aspect of the present disclosure, a chipset system is provided in an embodiment. The chipset system includes at least one processor, used to implement the method of any of the disclosed embodiments or aspects. The chipset system may further include a memory for storing program instructions and data. The chipset system may be comprised by chipsets, and may also be comprised by at least one of chipsets and other discrete device.

BRIEF DESCRIPTION OF THE DRAWINGS

Embodiments of the disclosure will now be described with reference to the attached drawings in which.

DETAILED DESCRIPTION

Figure 1:
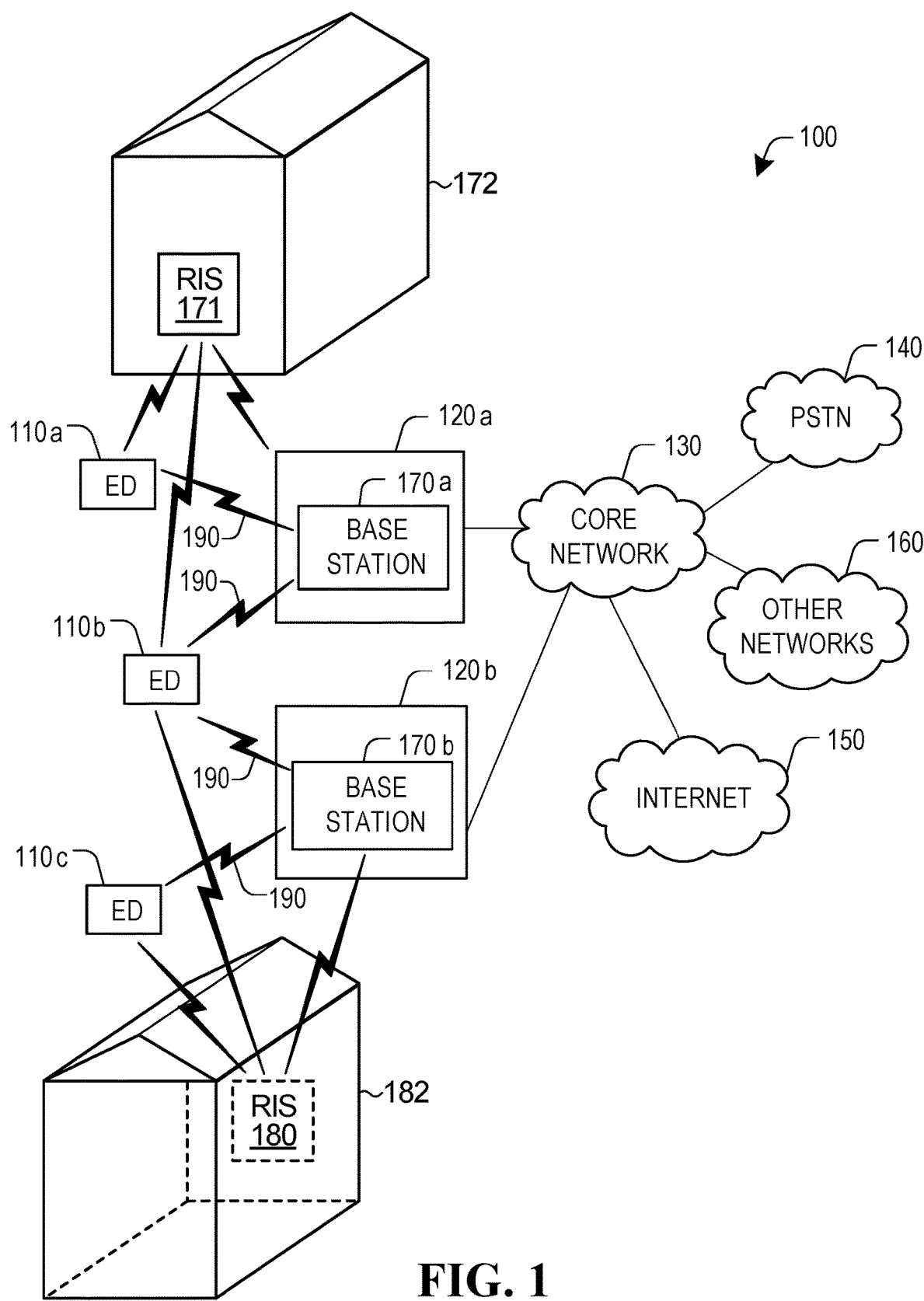
FIG. 1 shows an example of a network including an RIS.

In accordance with an aspect of the disclosure, to facilitate solving the problem of locating nodes within a network, use is made of at least one reflector to provide an additional reference point in a network. Each reflector has a fixed location known to the network, including known to TPs and known to EDs in the network. The location of the reflector is used as a reference point for determining the location of a node within the network.

There are many examples of objects in a network that have fixed location and can reflect incoming signals, including for example, building facades and walls. These objects do not actively transmit a Radio Frequency (RF) signal. In some embodiments, smart reflectors are used. For an object to be considered a smart reflector as the term is used herein, the object changes/manipulates an incident RF signal and reflects the RF signal after manipulation.

Examples of manipulation that may be performed by the smart reflectors are described in detail below, and include, for example:

a. Modifying the reflected signal in a reflector specific manner, for example by modifying the reflected signal based on a tag associated with the smart reflector; and/or b. Modifying angle of reflection.

Modifying the reflected signal in a reflector specific manner is detectable to a receiver of the reflected signal. The manner in which the signal is manipulated functions as a tag for the reflector, and for the corresponding reference point, the location of which is known to the network (TPs, EDs, etc.). This is referred to as environment tagging or media tagging.

Reconfigurable intelligent surfaces (RIS) are used for improving the beamforming gain for uplink and downlink communications. An RIS is made of a material that can reflect the incoming signal in a desired direction by configuring the elements inside. In that sense, an RIS behaves like an antenna array in which beam steering can be implemented through applying some phase shifts. An RIS is a passive element that uses the energy of the incoming signal for the reflection.

In some embodiments, to enable environment tagging, as a specific example of a type of smart reflector, RISs are employed. Another example of a smart reflector that may be used to enable environment tagging is a passive component that performs backscatter communications. In the remainder of the disclosure, it is assumed that the smart reflectors are RIS. However, it should be understood that other smart reflectors can alternatively be employed.

Environment Tagging Using RIS

In order to identify static objects in the environment that a signal may reflect off, like a building facade, some of these static objects are at least partially covered by an RIS. Each RIS manipulates an incoming signal in an RIS-specific way that makes it possible for the receiver to determine an identity of the RIS. In a specific and simplified example, a transmitted reference signal (baseband) may be represented in time domain as $$S=[s_1, \ldots, s_N]$$

Where S denotes the whole signal sequence and $s_i$ denotes the ith element of the signal sequence. In this case, the signal reflected by the kth smart reflector is given by (not taking into account delay):

$$A_k \odot S$$

where $A_k$ denotes a tag signature (label) configured for the kth RIS and $\odot$ denotes element by element multiplication. A tag signature is a specific example of a tag introduced previously. The tag signatures may be simple ON/OFF signatures or complex signatures (like Zadoff Chu (ZC), pseudo-noise (PN), etc.). The transmitted signal may, for example, be a position reference signal (PRS) which for the purpose of this description is any signal suitable or location determination. Examples of PRS configuration, which may be dependent upon a particular location determination algorithm being used, are provided below. In some embodiments, such as in mono-static sensing, the transmitted signal may include data targeted for some intended receiver(s).

The tag signatures $A_k$ are unique and therefore provide information about the identity of the RIS. Therefore, a node that processes the signal from the kth RIS can identify the tag signature $A_k$ and use that to obtain an associated location, for example from a look-up table. In some embodiments, the tag signatures are orthogonal, and this may further simplify the identification of an RIS.

For mono-static localization, described in further detail below, a node transmits a PRS towards one or more RIS and receives back a reflected signal from each RIS, and processes the reflected signals to identify the RISs.

For bi-static localization, described in further detail below, a node may receive the PRS signal in a first path directly from the transmitter of the PRS, and via a second path from an RIS, and there is a respective delay for each path. The received signal from the kth RIS taking into account the delay takes the form of $Y(t-\tau_1)$ in the baseband continuous time domain, where:

$$Y(t) = A_k(t) \cdot S(t-\tau_2)$$

Where $A_k(t)$ is the continuous time domain tag signature function, $S(t)$ denotes the continuous time domain baseband transmitted signal, $\tau_2$ denotes the time of flight (ToF) of the signal between transmitter and RIS and $\tau_1$ denotes the time of flight (ToF) of the signal between the RIS and the receiver. First, the tag signature $A_k$ is obtained from the received signal to identify the RIS. After identifying the reflecting RIS(s), the delay values $\tau_1$ and/or $\tau_2$ can be estimated from the received signal (like radar) and used to estimate the distance of the transmitting/receiving node to the kth RIS. The location of the node can be determined using distances from one or more reference points which include at least one reference point associated with a smart reflector, but which may also include other conventional reference points such as the locations of immobile transmit points. The location of the node may be determined using triangulation equations, which are well known.

When multiple such RIS are used, the positioning accuracy improves further. In some embodiments, the signal manipulation by the RIS is enabled during a phase during which location determination of a node is being performed. In some embodiments, during a normal data transmission phase, the signal manipulation feature is disabled so as not to affect the data transmission. In some embodiments, this signal manipulation is only performed when a PRS is sent by the transmitter. The RIS can be programmed/configured to perform this manipulation only when PRS is transmitted from the transmitter.

Location Determination Using RIS

Once a receiver identifies a signal as one that has been reflected off an RIS, as detailed above, the receiver can make measurements on the signal. The receiver can also make measurements on a directly received version of the signal. Examples of measurements that might be made include Signal to Noise Ratio (SNR), delay and direction (angle of arrival of the signal) and other related parameters that may be used to help obtaining the position information for the receiver. These measurements, in conjunction with information concerning the location of the RIS are then available for use in determining the location of the receiver.

Various options exist for transmission of the PRS:
a. The PRS may be transmitted by the same device that is receiving the PRS for which location is being determined (referred to as mono-static localization below);
b. The PRS may be transmitted by another device, for example a statically located transmitter such as a statically located TP (this scenario is referred to as bi-static localization below);
c. The PRS may be transmitted by another device that is mobile, for example a mobile TP.

Corresponding options exist for the reflected signal:
a. The reflected signal may be a reflection of a PRS transmitted by the same device that is receiving the PRS for which location is being determined;
b. The reflected signal may be a reflection of a PRS transmitted by another device, for example a statically located transmitter such as a statically located TP;
c. The reflected signal may be a reflection of a PRS transmitted by another device that is mobile, for example a mobile TP.

Generally, use is made of measurements made for at least one reflected signal for the purpose of location determination for the receiving device, either by the receiving device per se, or by another device. Various detailed examples are described herein including:
a. Using measurement information of at least one reflected signal and RIS location to determine receiver location; and
b. Using measurement information of at least one reflected signal and RIS location and measurement information of at least one directly received signal having a known location to determine receiver location.

FIG. 1 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device. In some of the detailed embodiments described below, it is assumed that the location of an ED is to be determined. More generally, for any of the embodiments described herein, the methods can be used to determine the location of an ED as described above. In addition, the methods can be used to determine the location of mobile base stations such as mobile transmit points.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a-170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA20001×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Also shown is an RIS 171 mounted to a building 172 in the coverage area of base station 120a, and an RIS 180 mounted to a building 182 in the coverage area of base station 120b. More generally, within a given network, there is one or more RISs that is/are installed and configured to assist in one or more of the ED location determination methods described herein. Note that depending on the location of the RIS and the location of the base stations in the network and also the location of the ED, there may be some base stations that are not able to use an RIS to assist in ED location determination. In other cases, there may be multiple RIS available to assist in ED location determination. While in the example of FIG. 1, the RIS are shown mounted to buildings, more generally, they are mounted to any suitable structure with a fixed location. The operation of the RIS is described in detail by way of example below.

Figure 2A:
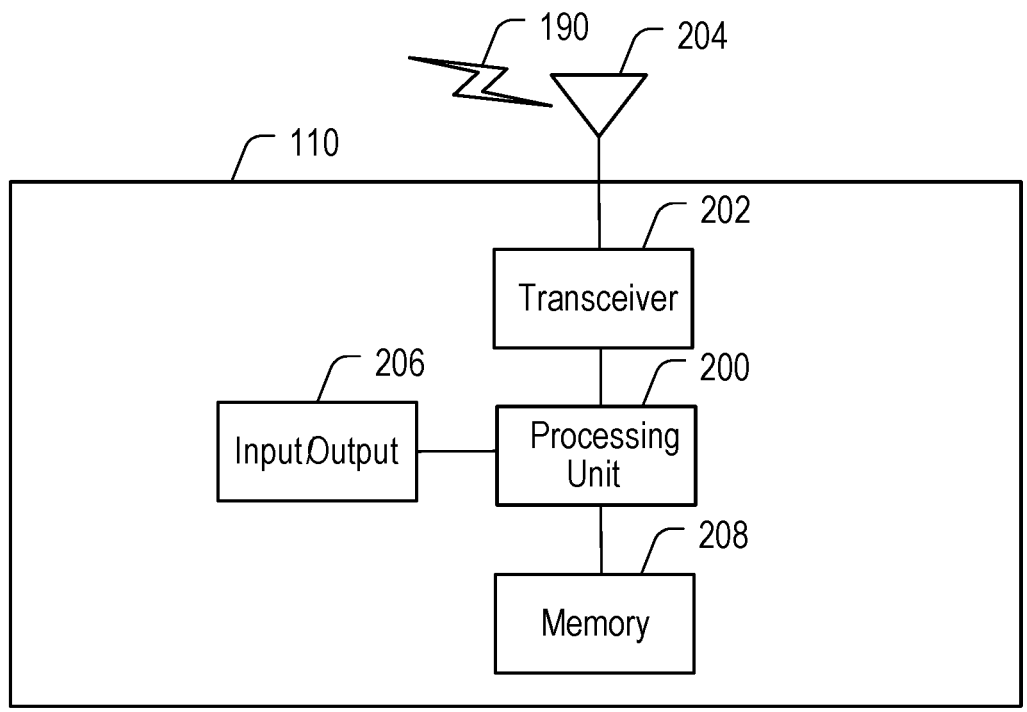
FIG. 2A is a block diagram of an example electronic device.
Figure 2B:
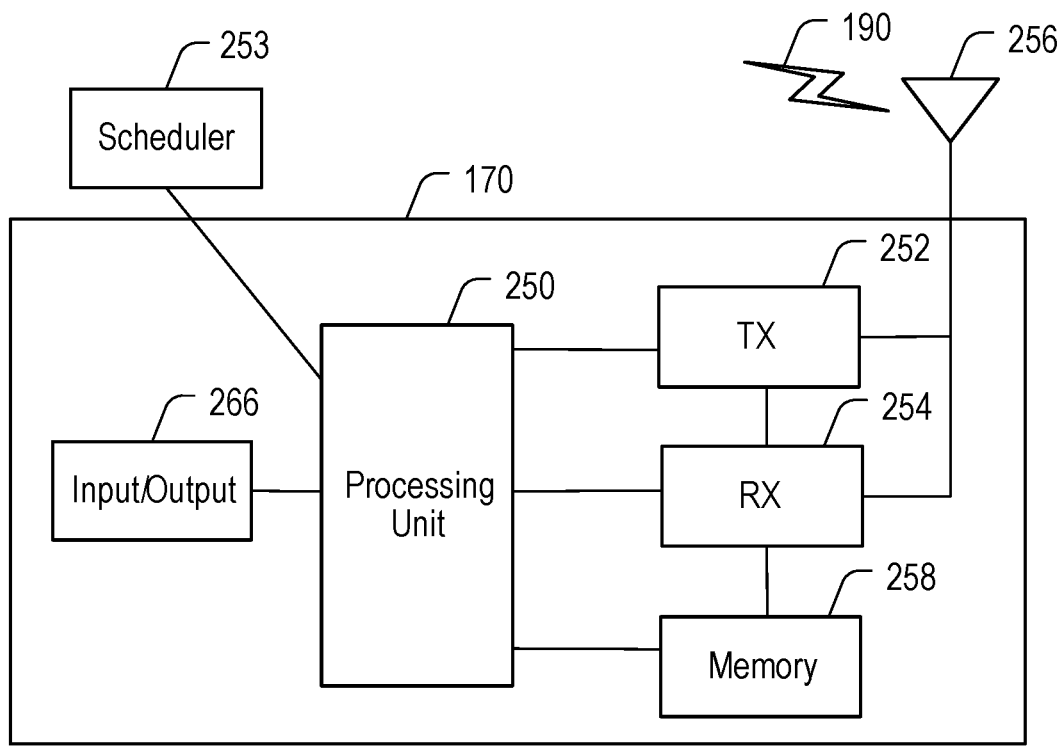
FIG. 2B is a block diagram of an example electronic device.

FIG. 2A and FIG. 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The ED 110 is configured to perform measurements on the received signals including the signals transmitted through the beams received directly from base stations, and reflected beams received via an RIS. Example methods are described in detail below. The ED may receive signaling from the network instructing the ED on how to perform these measurements; this may, for example indicate which resources to measure and/or timing of the measurements, and/or what parameters to measure. The ED then calculates its location based on these measurements and/or signal the measurements to the network for the network to make the calculation.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Receiver Localization

Figure 3:
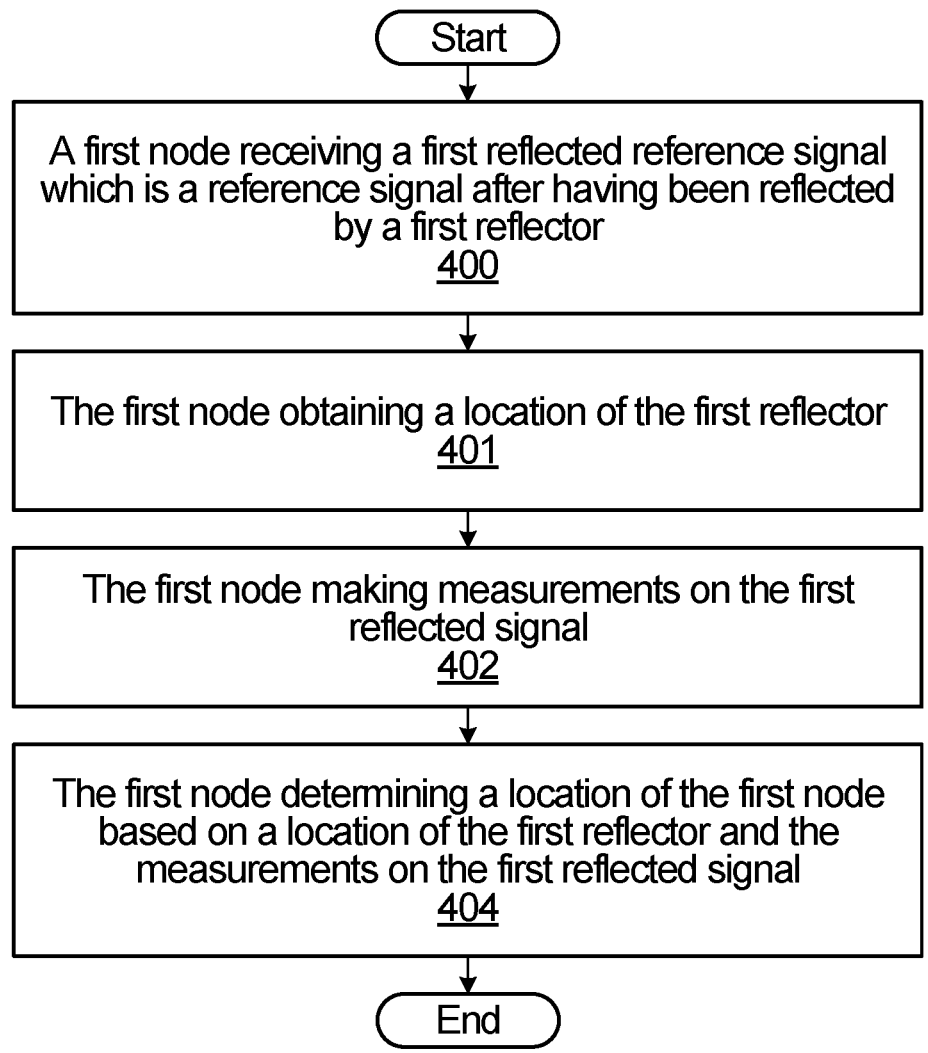
FIG. 3 is flowchart of a general method of using smart reflectors for determining the location of a receiver.

Referring now to FIG. 3, shown is a flowchart of a general method of determining the location of a receiving node provided by an embodiment of the application. In block 400, a first node receives a first reflected reference signal which is a reference signal after having been reflected by a first reflector. In block 401, the first node obtains a location of the first reflector. In block 402, the first node makes measurements on the first reflected signal. In block 404, the first node determines a location of the first node based on a location of the first reflector and the measurements on the first reflected signal. The first node may determine the location of the reflector using the tagging approach described above, or it may otherwise be aware of the location of the detector.

While FIG. 3 shows that the location determination is performed by the receiving node, in another embodiment, the receiving node can send the measurements to another node, for example a base station, and the base station determines the location of the receiving node.

Various detailed examples of the method of FIG. 3 are described below.

Mono-Static Localization

In some embodiments, the transmitter of the PRS and the receiver of the PRS are located at the same node. This is referred to as mono-static localization. The node that transmits and receives the PRS, and for which location is being determined, may be an ED or a TP. The received signal after reflection by a particular RIS will have the tag signature of the particular RIS applied to the transmitted signal. The signal will be received with a delay due to the distance between the node (containing both the transmitter and the receiver) and the RIS.

By processing the received signal and obtaining the tag signature, delay, and angle of arrival information (possible to obtain, for example by performing narrow beamforming), the distance and direction can be obtained of the node relative to the RIS, and based on this the location of the node can be obtained with high accuracy.

Figure 4:
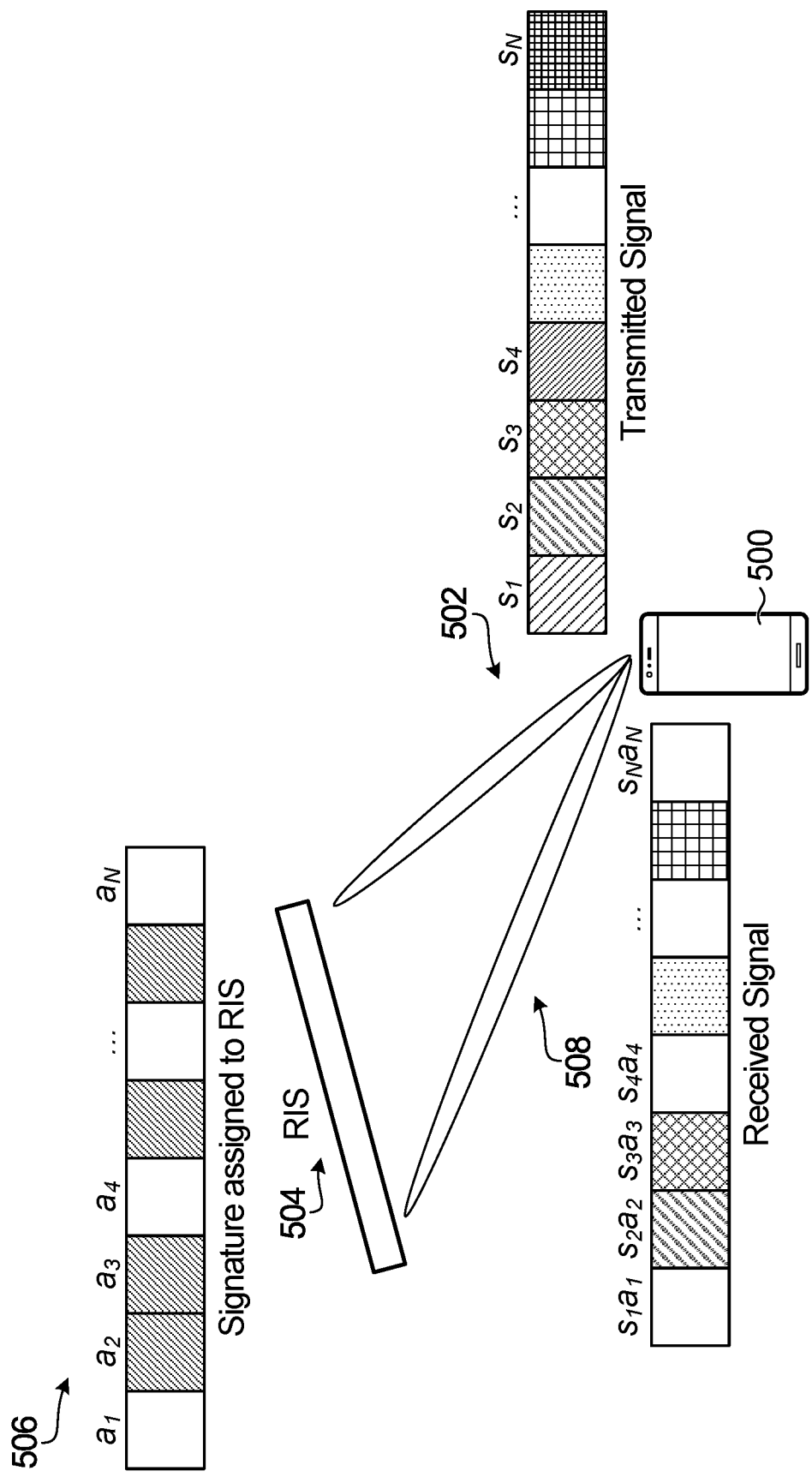
FIG. 4 is an example of mono-static localization using RIS.

An example is shown in FIG. 4, which shows a node 500 containing both a transmitter and a receiver. The node 500 transmits a reference signal 502 ($S=s_1, s_2, \ldots, s_N$) which is reflected off an RIS 504 having an assigned tag signature 506 ($A=a_1, a_2, \ldots, a_N$). The RIS 504 applies the tag signature 506, and a reflected signal 508 ($a_1s_1, a_2s_2, \ldots, a_Ns_N$) to which the tag signature has been applied, is received by the node 500. The node 500 processes the signal to determine the tag and the round trip delay. Note that the impact of the propagation delay on the reflected signal is not shown in this simple representation.

Figure 5:
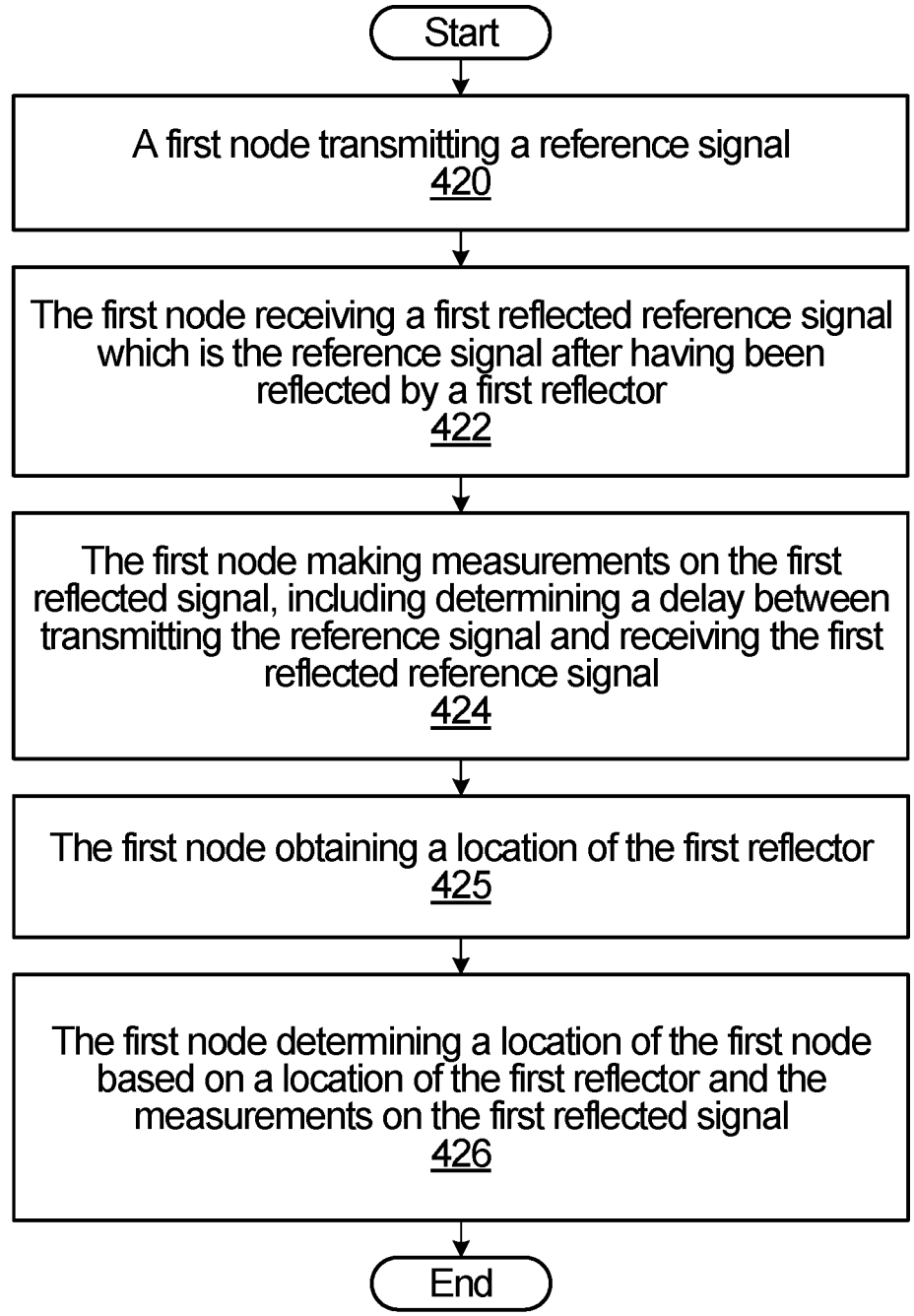
FIG. 5 is a flowchart of a method of mono-static localization using RIS.

FIG. 5 is a flowchart of a method of mono-static localization. The method begins in block 420 with a first node transmitting a reference signal. In block 422 the first node receives a first reflected reference signal which is the reference signal after having been reflected by a first reflector. In block 424, the first node makes measurements on the first reflected signal, including determining a delay between transmitting the reference signal and receiving the first reflected reference signal. In block 425, the first node obtains a location of the first reflector. In block 426, the first node determining a location of the first node based on a location of the first reflector and the measurements on the first reflected signal. The first node may determine the location of the reflector using the tagging approach described above, or it may otherwise be aware of the location of the detector.

While FIG. 5 shows that the location determination is performed by the receiving node, in another embodiment, the receiving node can send the measurements to another node, for example a base station, and the base station determines the location of the receiving node.

Bi-Static Localization

In another embodiment, the node that is transmitting the PRS and a node containing the receiver of the PRS, and for which location is to be determined, are two different nodes. For example, transmitting node might be a statically located TP, and the receiving node might be an ED or a mobile TP. Alternatively, the two nodes may both be EDs. In another embodiment, both nodes are base stations. For example, a fixed base station may send the PRS to a mobile base station or vice versa.

In some embodiments, the transmitter of the PRS is an immobile TP with a known location; a direct signal from the known immobile TP and one reflected signal can be used for bi-static localization.

In another embodiment, the transmitter of the PRS has unknown location (for example a TP with unknown location (e.g. a mobile TP)), in which case signals from two known RIS are used for bi-static localization.

All of these are examples of bi-static localization.

Based on an environment map and an approximate location of the receiver to be localized, there is some number, defined here as K, of potential RIS that have the possibility of reflecting a PRS signal for reception by the receiving node for use in location determination. K is a function of the particular location of the receiver, and may differ from location to location.

The sum of the reflections of the PRS signal off the K RIS, collectively, can be viewed as an aggregate signal at the receiver. The part of the aggregate signal due to the reflection of the PRS off one RIS is referred to herein as a component of the aggregate signal. The aggregate signal can be written as:

$$y = \sum_{k=1}^{K} \alpha_k A_k \odot S$$

where $\alpha_k$ denotes an indicator variable which is non-zero if the aggregate signal includes a component due to reflection off the kth RIS towards the receiver and 0 otherwise. Also, each component experiences a respective propagation delay (not shown in the equation).

For the purpose of localization, the receiver needs to identify the variables $\alpha_k$, $k=1, \ldots, K$ based on the received signal which gives the identity of RIS in the vicinity of the node that are reflecting the signal to the node. Using the identities, the node can then determine the location of each of the reference points using stored information. The receiver also determines a respective associated delay for the signal from the kth smart reflector. Based on the location and delay information, the receiver determines a relative distance between the kth reflector and the receiver.

Knowledge of the transmitted PRS S and potential signature set $A_k$ is needed at the receiver; equipped with this information, the problem at the receiver of identifying which signatures are present in the aggregate signal is a classic detection problem, and any suitable detection approach can be implemented. For example, compressed sensing, minimum mean square error (MMSE) or zero forcing algorithms may be employed.

To further facilitate the detection, the tag signatures can be selected to be vectors that are orthogonal to each other (for example Walsh-Hadamard sequences).

By processing each path (including the direct path, and a respective path for each component from an RIS present in the received signal), including obtaining reference signal received power (RSRP), delay, and/or direction (including angle of arrival), a precise position for the receiver can be obtained.

Figure 6:
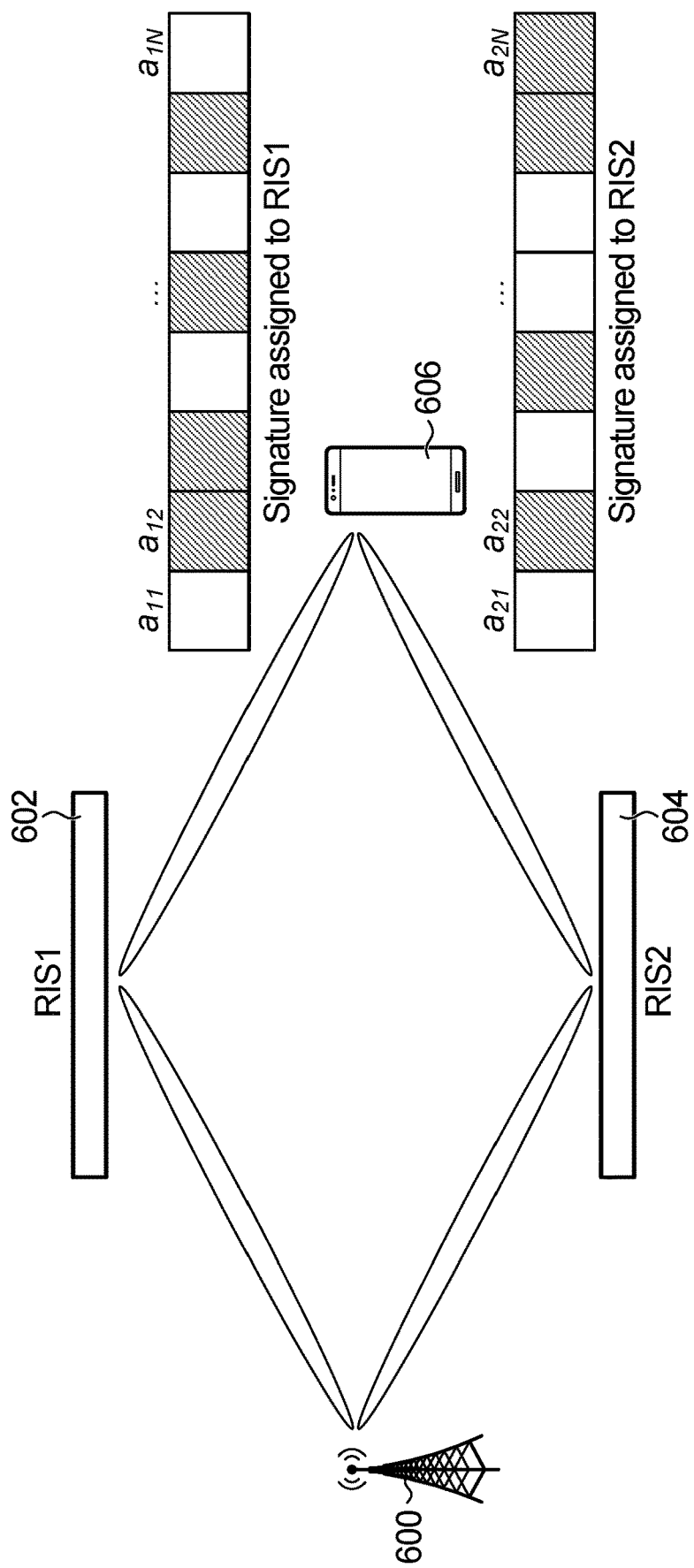
FIG. 6 is an example of bi-static localization using RIS.

An example is shown in FIG. 6, which shows a node 600 containing a transmitter, and another node 606 containing a receiver. The node 600 transmits a reference signal which is reflected off an RIS1 602 having an assigned tag signature ($A=a_{11}, a_{12}, \ldots, a_{1N}$). The reference signal is also reflected off another RIS2 604 having an assigned tag signature ($A=a_{21}, a_{22}, \ldots, a_{2N}$). The node 606 processes the signals to determine the tags and the round trip delays.

Figure 7:
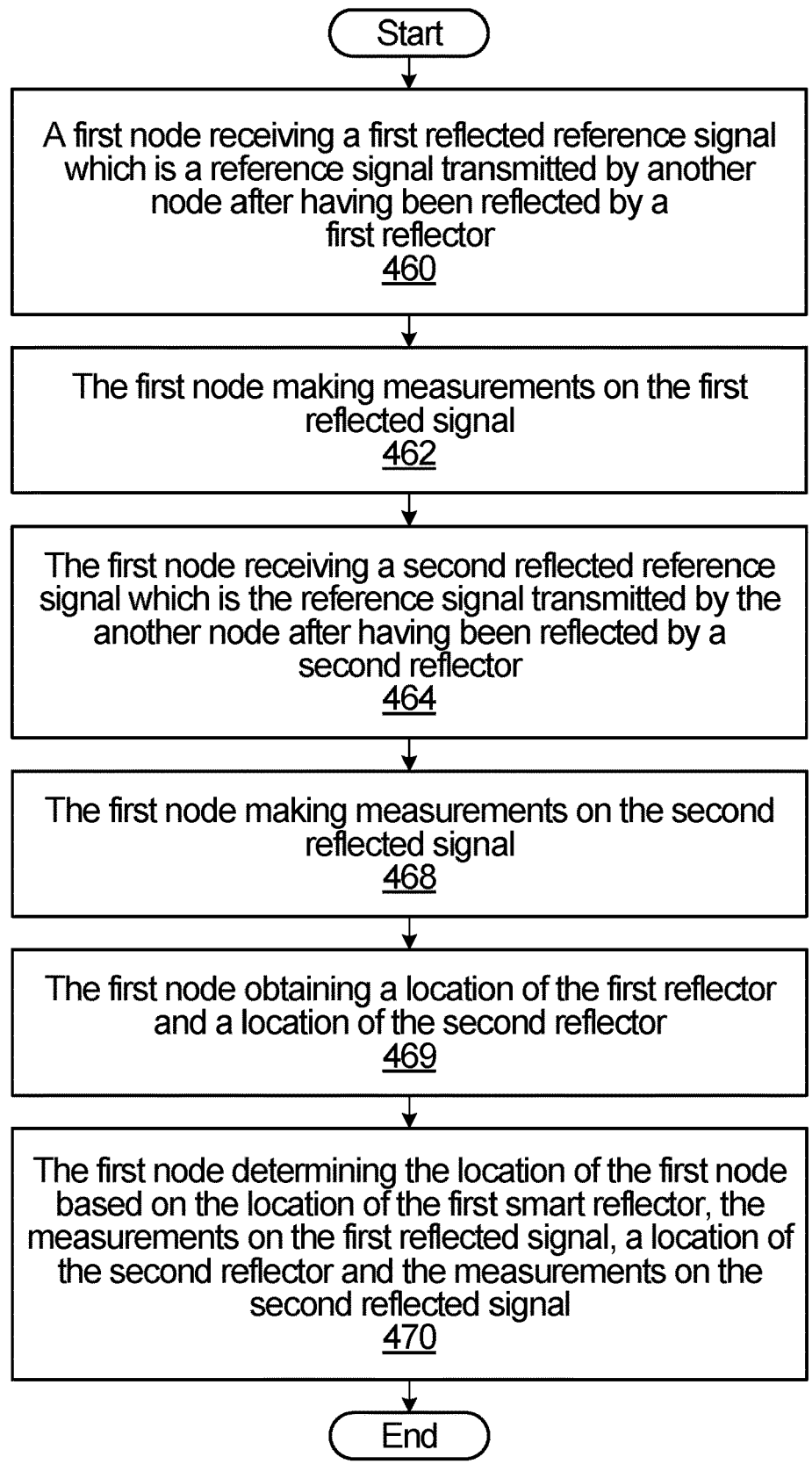
FIG. 7 is flowchart of a method of bi-static localization using RIS.

FIG. 7 is a flowchart of a method of bi-static localization. The method begins in block 460 with a first node receiving a first reflected reference signal which is a reference signal transmitted by another node after having been reflected by a first reflector. In block 462, the first node making measurements on the first reflected signal. In block 464, the first node receives a second reflected reference signal which is the reference signal transmitted by the another node after having been reflected by a second reflector. In block 468, the first node makes measurements on the second reflected signal. In block 469, the first node obtains a location of the first reflector and a location of the second reflector. In block 470, the first node determines the location of the first node based on the location of the first reflector, the measurements on the first reflected signal, a location of the second reflector and the measurements on the second reflected signal. The first node may determine the location of the reflector and the second reflector using the tagging approach described above, or it may otherwise be aware of the location of the detector.

While FIG. 7 shows that the location determination is performed by the receiving node, in another embodiment, the receiving node can send the measurements to another node, for example a base station, and the base station determines the location of the receiving node.

Network Configuration

Various configurations on the network side may be performed to facilitate the disclosed method. Specific examples of network configuration for transmission of the PRS include:

PRS bandwidth: this may be set depending on positioning accuracy requirement;

PRS waveform: note that since RIS signal tagging can be realized in the time domain, a waveform with higher time-domain granularity is preferred. For example, a single-carrier waveform may be an option;

PRS length (N): this may be determined based on one or a combination of:
  i) required positioning accuracy: the larger N is, the higher the expected accuracy due to larger processing gain;
  ii) PRS duration;
  iii) RIS configuration rate: the PRS symbol time (duration of $s_i$) is limited to how fast an RIS signature can be applied by an RIS (more generally to how fast a smart reflector can apply a signature);

PRS sequence: a sequence with good autocorrelation will allow for better delay estimation.

Specific examples of network configuration of signatures for RIS include:
  signature sequence design and length;
  preparation and update of a signature map in a look-up-table (LUT); for each region;
  in some embodiments, each region has its own look-up table;
  signalling of the signature map information to the EDs depending on their approximate location.

Specific examples of network configuration, for embodiments where the ED transmits the reference signal, include:
  transmission/reception of indication to instruct the ED about transmission of reference signal transmission.

ED Configuration

Various configurations on the ED side may be performed to facilitate the disclosed method. Specific examples of ED configuration for transmission of a PRS include the above introduced PRS bandwidth, PRS waveform; PRS length (N); or PRS sequence.

In some embodiments, the ED may receive a configuration of RIS signatures from the network. The ED may receive an indication to inform the ED of reference signal transmission from the network or other EDs (via sidelink (SL) transmission). In some embodiments, the ED may receive an indication for reference signal transmission by the ED to the network or other EDs (via SL).

Single TP Positioning

Another embodiment provides a system and method for performing ED positioning with a single active TP (more generally a single other node) to alleviate the issues of mismatch in the synchronization, oscillator frequency or phase shift of multiple TPs and at the same time, providing enough equations to obtain the ED location accurately.

In this embodiment, the property and capability of an RIS to reflect an incoming signal towards a specified direction is used in positioning. For this embodiment, it is assumed that the ED is aware of the location of the one or more RIS that participate in the method, and is aware of which component of a received signal is received directly as opposed to after reflection by an RIS. In a specific example, the tag signature approach described above can be employed for this purpose, but other approaches may alternatively be employed.

One or more reconfigurable intelligent surfaces are used to reflect an incident beam (a PRS from a primary TP) over multiple directions during respective time periods. As a result of this, from the receiving node's perspective, it appears that there are one or more imaginary TPs which can be used to assist the primary TP in positioning. To enable this, RIS are implemented in known locations, for example, on a façade of a building whose location is known to both ED and TP, and the components of the RIS are configured by the network to reflect the incident beams over one or more pre-determined directions instructed by the network. This can be done, for example, by programming the RIS to adapt its structure based on the configuration dictated by the network. One example is the configuration of p-type-intrinsic-n-type (PIN) diodes in an RIS to apply some phase change on the incident beam such that the overall reflected signal is reflected in a certain direction.

Figure 8:
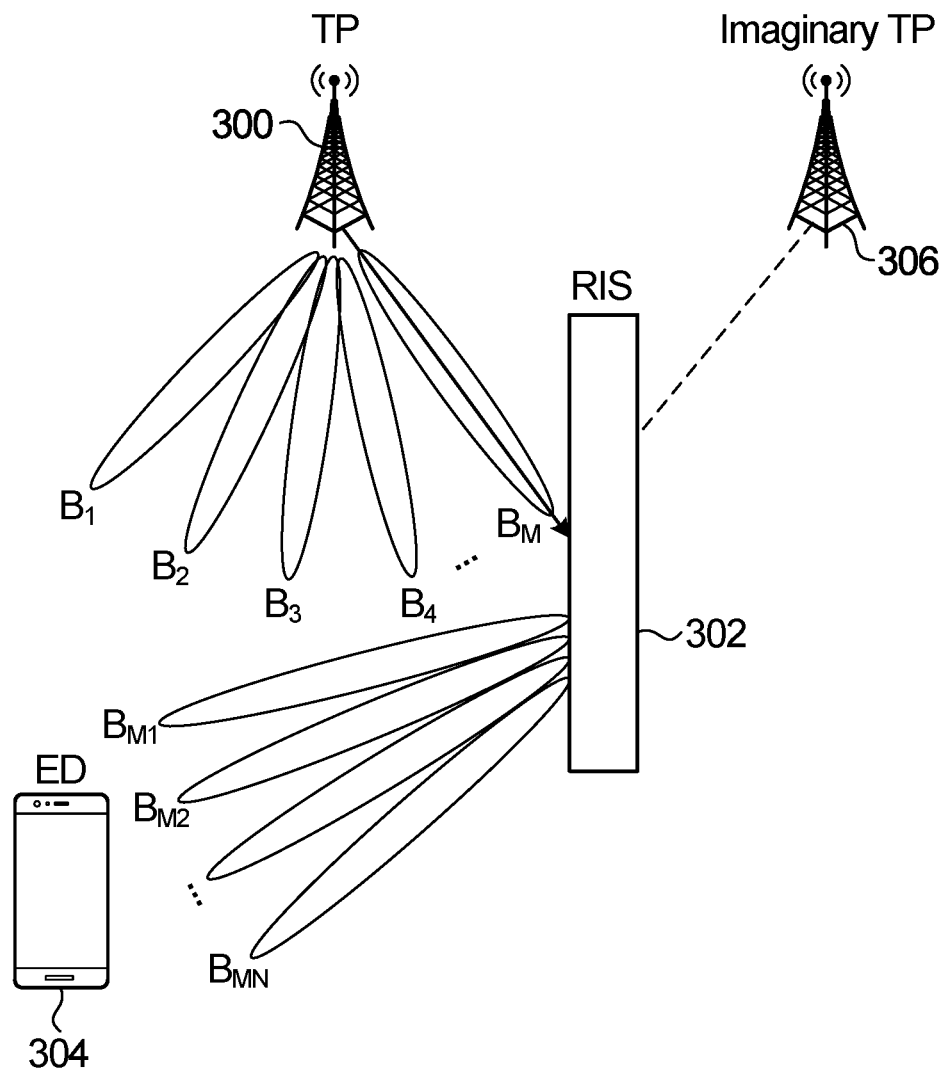
FIG. 8 is a block diagram of a network configured to perform single-TP positioning using RIS with beamforming at the TP.

Referring now to FIG. 8, shown is an arrangement that includes a TP 300, an RIS 302 having a fixed location that is known to entities in the network (including the TP and EDs) and an ED 304. The TP 300 is configured to transmit multiple primary beams containing a PRS for the EDs in a given coverage area, including ED 304 in the illustrated example. The primary beams are indexed from $B_1$ to $B_M$, assuming there are M such beams in total, and are labelled as such in FIG. 8. Out of these beams, one or more are transmitted towards the RIS 302 (more generally to an RIS with a location that is known to the TP and the ED). A beam that is transmitted towards the RIS 302 is referred to herein as an RIS beam, but other than the direction, it need not be different from any other beam. In the illustrated example, an incident beam $B_M$ is transmitted towards the RIS 302 and is therefore an RIS beam. RIS 302 directs a reflected beam towards some pre-determined/pre-configured directions. These beams from the RIS 302 are referred to herein as virtual beams. The direction of reflection for the RIS 302 is configured, and known to the receiving node, for each of one or more time periods that the incident beam $B_M$ is being transmitted towards the RIS 302. The virtual beams are indexed by $B_{M1}, \ldots, B_{MN}$, assuming there are N possible beams in total, and are labelled as such in FIG. 8. As can be seen in the FIG. 8, from the ED perspective, the reflected beams ($B_{M1}, \ldots, B_{MN}$) appear to be coming from are a second (imaginary) TP indicated at 306. While there are N possibilities for the reflected beam, only one beam is actually produced at given time period that the incident beam is being transmitted towards the RIS 302, depending on the configuration of the RIS for that period. If the PRS is transmitted towards the RIS over multiple time periods, different configurations (i.e. different angles of reflection) may be applied by the RIS during each time slot resulting in a different reflected beam in each time period, again the configurations being known to the receiving node.

The location of the ED is determined based on one or more of the beams transmitted directly to the ED, and one or more of the beams transmitted via the RIS. Because all of the beams used for positioning ultimately arrive from the same TP, the positioning is performed with only one oscillator which eliminates the need for inter-TP synchronization (time and frequency), a process that is costly and imprecise.

Figure 9:
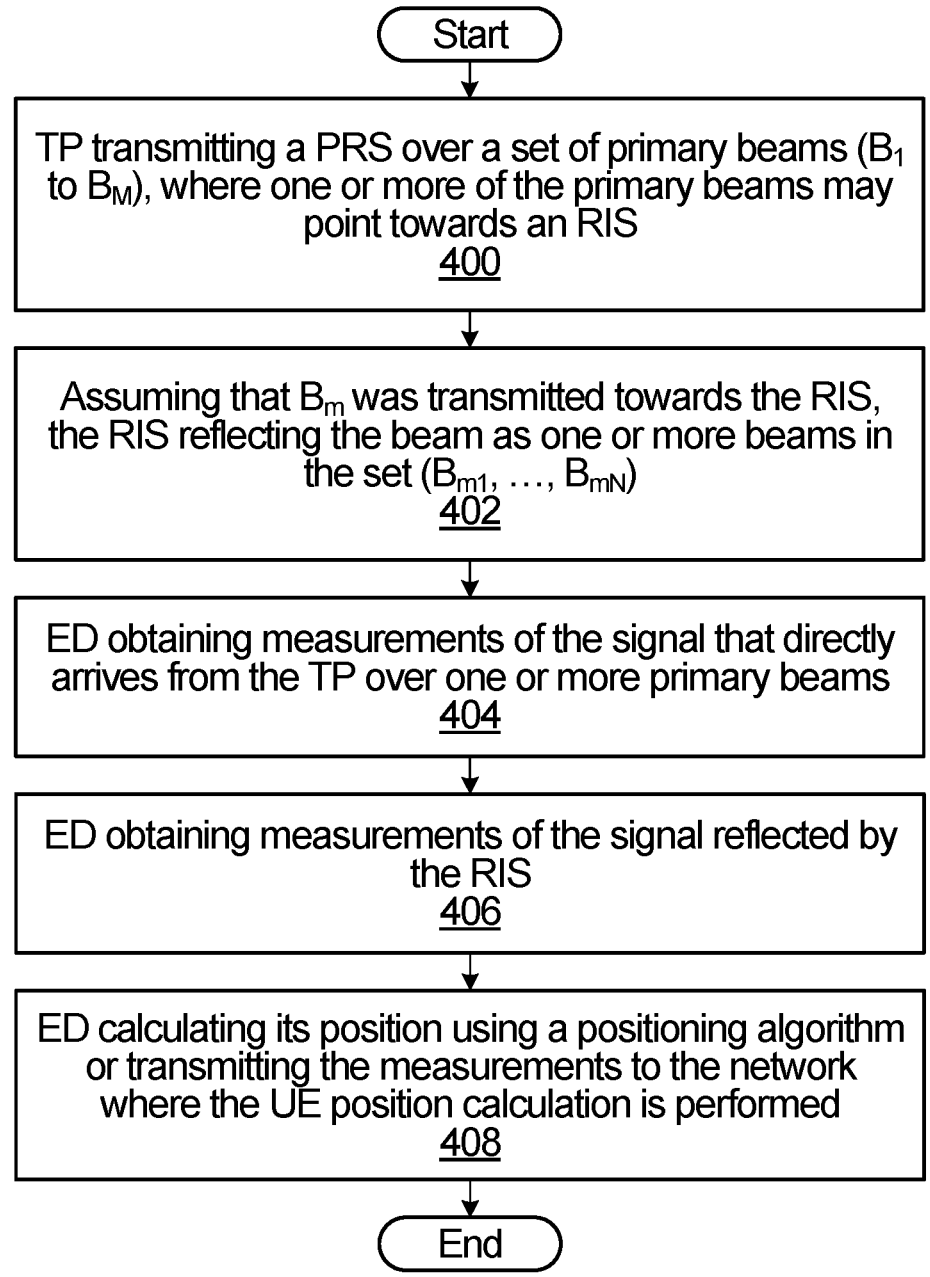
FIG. 9 is a flowchart of a method of single-TP positioning.

The method will now be described in further detail with reference to the flowchart in FIG. 9, where it is assumed the receiving node is a ED. The method begins in block 400 with a TP transmitting a PRS over a set of primary beams ($B_1$ to $B_M$), where one or more of the primary beams may point towards an RIS. In some embodiments, the TP transmits over these beams simultaneously. This may for example involve power sharing, using multiple antenna arrays or digital beamforming. In some embodiments, the TP transmits over these beams in different time slots. During at least one of these time slots, the PRS signal is transmitted toward the RIS. For example, where M is 10, the TP may transmit primary beams $B_1$ to $B_{10}$ simultaneously during one time slot, or with time separation over up to 10 different time slots.

In block 402, assuming that $B_m$ was transmitted towards the RIS, the RIS reflects the beam as one beam n the set ($B_{m1}, \ldots, B_{mN}$), depending on the beam steering configured in the RIS. In another embodiment, the RIS reflects the beam over more than one beam in the set.

The configuration of beam steering performed by the RIS including the time slots when the PRS is transmitted toward the RIS, also referred to herein as RIS time slots, as well as the configuration of reflected beam indices is signaled to the ED beforehand, so that this is a common information between network and ED.

In block 404, the ED performs measurements of the signal that directly arrives from the TP over one or more primary beams. In block 406, the ED performs measurements of the signal reflected by the RIS. Blocks 404 and 406 may be combined in one step. In block 408, the ED calculates its position using a positioning algorithm. Alternatively, the measurements obtained in block 404 and 406 may be transmitted to the network where the ED position calculation is performed.

Different measurements may be taken in blocks 404 and 406 depending on the positioning algorithm employed in block 408. In some embodiments, positioning is based on ToA (time of arrival), and ED measures the delay between the received time of the signal and the transmitted time by the TP for the two paths. These delays can be converted into a first distance between TP and ED, and a second distance which is a sum of the distances between the TP and the RIS and the RIS to the ED. Since the distance between TP and RIS is known, a third distance between ED and RIS can be obtained from the second distance. The ED position can then be determined based on the first distance and the third distance, and together with knowledge of the position of the TP and the RIS. This solution works when the ED is synchronized with the network, in which case the time of transmission of the PRS can be known with sufficient precision.

In an alternative to the approach described with reference to FIG. 9, in some embodiments, suitable for where there is no direct link between TP and ED, the same procedure can be followed with two or more RIS to obtain the distance between RIS1 and the ED, and the distance between RIS2 and the ED (in place of step 404 of FIG. 9) to obtain the ED location.

In another embodiment, suitable for the scenarios when the synchronization between ED and network cannot be assumed, the ED uses a positioning algorithm based on observed difference time of arrival (OTDOA). In this embodiment, the ED measures the relative delay between the signal received directly from the TP (delay is $d_{UE-TP}$) and the reflected signal by RIS (delay is $d_{RIS-TP}+d_{RIS-UE}$) This gives a difference of $d_{RIS-TP}+d_{RIS-UE}-d_{UE-TP}$. From this value alone it is not possible to determine the exact location of the ED. However, this value can be used to determine a hyperbola over which the ED is located. To get more accurate location, the RIS property of configured reflection is used. The RIS is programmed/configured to reflect the output signal over one or more pre-determined beams which are known by the ED. Depending on the direction of the ED to the RIS, some of the beams will result in higher SNR/ higher RSRP. Therefore RSRP measurement over the reflected beams gives information about the direction from the ED to the RIS, and this information together with the distance information can be used to determine the ED location. The ED also performs measurements on the regular beams transmitted by the TP and not reflected by the RIS. Based on these measurements, a precise ED location can be obtained.

In embodiments where the ED feeds back measurement information to the network, optionally the ED transmits measurement information in association with a reflected beam index so the network can match the measurements with the beam index.

Network Behaviour

The network (e.g. TP) is responsible for transmitting the PRS over the primary beams and the RIS beams as described in detail above. In addition, the network transmits signaling from the TP to the ED to inform the ED of the beam configuration. Signaling from the TP to the ED may include one or more of the following to convey the beam configuration to the ED:

a. RIS tag signature information (as a look up table for example): through higher layer signaling.

b. RIS beam indication: Since the behavior of the ED is dependent upon whether a particular beam transmitted by the TP is transmitted towards the RIS or not, this information should be signaled to the ED. Recall that an RIS beam is a beam (out of the primary beams transmitted by TP) which points to an RIS. In some embodiments, this signaling can be a binary indicator, with one bit per beam indicating whether the beam is an RIS beam or not. In some embodiments, the signaling is transmitted dynamically (for example layer 1 signaling). In some embodiments, the signaling is semi-static and is communicated to the ED through higher layer signaling such as radio resource control (RRC), or medium access control (MAC) control element (MAC-CE). Alternatively, a combination of layer 1 and higher layer signaling may be employed.

c. Signalling of average delay: For the primary beams, a parameter reflecting the average delay may be signaled by the network to the ED. The average delay may be based on the approximate positioning of the ED based on statistics obtained by the network. Providing the ED with the average delay information may narrow down and simplify the measurements made by the ED. For RIS beams, two or more delay values may be signaled, including one related to the direct path from the TP to the ED and one related to the path from the TP to the RIS to the ED. This signalling may be dynamic (e.g. layer 1 signaling);

d. Reflected beam indices indication: this indication informs the ED which of the reflected beams (out of the set of pre-determined reflected beams by RIS) are present during each time slot and/or each measurement window. Note that as used herein, a time slot is a period during which a beam is transmitted, and a measurement window is a period during which a receiver makes measurements. The reflected beam indices indication conveys the identity of which beam indices are configured by the network to be reflected off the RIS. If multiple indices are signaled, the order as well as the individual measurement window for each beam should also be signaled. This signaling may be semi-static and communicated to the ED through higher layer signalling such as RRC, and MAC-CE. This signaling should line up with the RIS beam indication. More specifically, the RIS beam indication indicates which beam transmitted by the TP is directed towards the RIS and over what time periods, and the reflected beam indices indicate, for each time period that there is a beam transmitted by the TP directed towards the RIS, which reflected beam out of the set of possible beams, is produced by the RIS.

e. Measurement window: TP may notify an ED if there is any change in the measurement window. This includes signalling the whole measurement window (for processing primary and reflected beams) and/or signalling the individual measurement windows for each of the primary and reflected beams. In some embodiments, the difference between the new measurement window compared to a regular measurement window (for example, one used for baseline positioning calculation) is signaled.

f. Measurement parameters: the TP may notify the ED of what parameters to measure for the various beams.

PRS Signal Design for the RIS Beams

In some embodiments, the PRS signal transmitted by the network is specifically configured to enhance suitability for use on RIS beams. For example, in some embodiments, PRS signals are configured/designed to allow for the fact that the ED needs to measure two (or more) delay values during the measurement window of RIS beams. In some embodiments, the resource allocation (e.g. time/frequency resource allocation) for PRS transmission is performed with the objective of avoiding peak aliasing when computing the autocorrelation of the received signal, as the received signal is a superposition of the direct signal and the reflected signal. This can impose a constraint on resource allocation. For example, a comb design, which can be applied for the ordinary beams, may not be appropriate for the RIS beams.

Due to the time/frequency resource allocation constraint upon the PRS for an RIS beam discussed above, a higher bandwidth might be required for the RIS beam than for regular beams. In some embodiments, suitable for example if the ED cannot support the higher bandwidth, the resource allocation for PRS transmission may include frequency hopping. For example, an available bandwidth may be divided into multiple sub-bands and in each time slot, the resource allocation for PRS is only defined over a particular sub-band for the ED of interest.

In case of configuring multiple RIS beams for the same measurement window, since the sweeping time and the measurement window for the reflected beams may be different from the original beams, in some embodiments a different signal design for the RIS beams is provided in terms of waveform and/or numerology. For example, a single-carrier waveform may be used for more accurate delay estimation given a shorter measurement window. In another example, which impacts numerology, shorter symbols may be used for the reflected beams.

UE Behaviour

The ED is configured to process two separate types of beams. These include the regular beams (used for traditional positioning) and the reflected beams from the RIS. The ED performs separate delay measurements (or other measurements) for the signal coming from the TP (direct signal) and for the signal reflected from the RIS (reflected signal).

Figure 10:
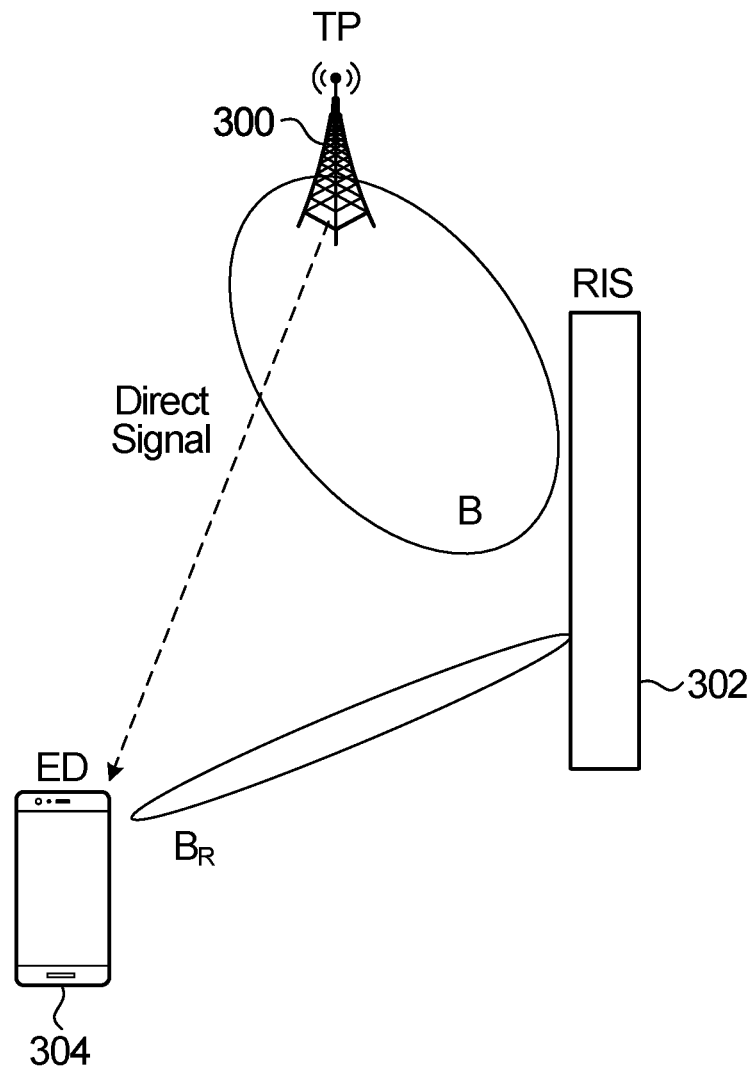
FIG. 10 is a block diagram of a network configured to perform single-TP positioning using RIS without beamforming at the TP.

The details of ED processing depend on beamforming design. In some embodiments, as described above, the TP does not apply beamforming. In this case, the direct signal which is used for a normal positioning process, is also reflected back from the RIS. In this case, the ED receives the direct signal over the wide beam and the reflected signal received over a narrow beam simultaneously. The ED performs delay measurement for each of the two signals. Optionally, the RIS 302 is configured to produce the narrow beam as one of a set of possible beams. An example is depicted in FIG. 10 where the TP 300, RIS 302 and ED 304 are labelled. FIG. 10 shows a single wideband beam B transmitted by the TP 300, and a reflected beam $B_R$.

Figure 11:
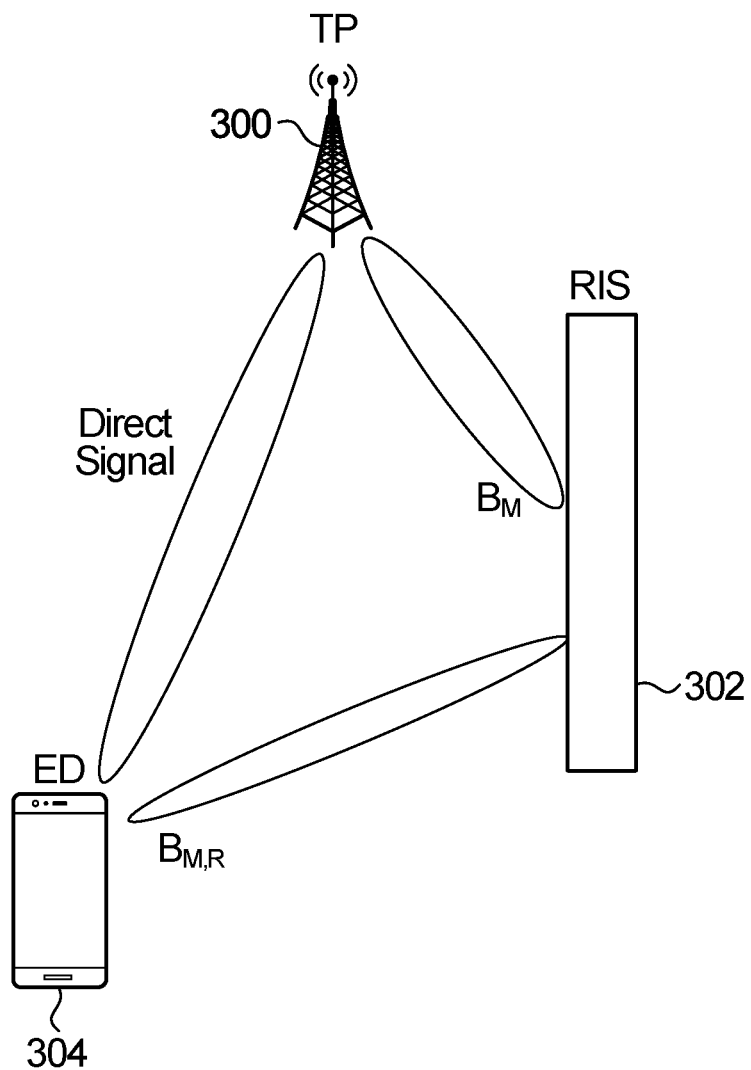
FIG. 11 is a block diagram of a network configured to perform single-TP positioning using RIS in which a direct beam from a TP is swept.

In other embodiments, as described above, the TP performs beamforming and the RIS beam is fixed but the direct beam is swept. An example is depicted in FIG. 11 where the TP 300, RIS 302 and ED 304 are labelled. This example is more appropriate than the approach of FIG. 10 when a higher transmission frequency range (for example mm wave range) is employed. In this case, the ED receives the direct signal and reflected signal over two different beams and hence, over different time slots. Again, the ED performs delay measurement for each of the two signals. FIG. 11 shows a direct beam and a beam $B_M$ transmitted towards the RIS 302, and a reflected beam $B_{M,R}$.

In some embodiments, the RIS beam is always active and the direct beam is swept. In this case, the direct beam and RIS beam are simultaneously present. In this case, the ED receives the direct signal and reflected signal over two different beams over the same time slot. Again, the ED performs delay measurement for each of the two signals.

As detailed above, in some embodiments, the ED processes a directly received beam and a beam which has been reflected by the RIS. In some embodiments, these are transmitted in the same time slot, and the signals received over the RIS beam and the direct beam may be on the same PRS resource set. In other words, the ED receives a superposition or aggregation of the PRS signal over the direct beam and the reflected beam.

Figure 12:
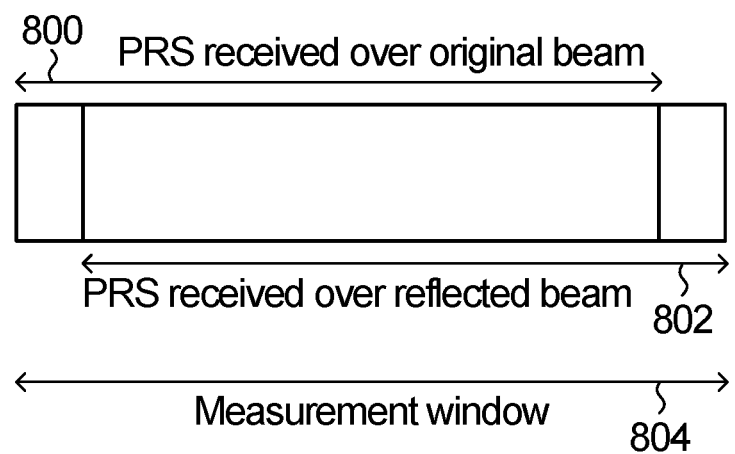
FIG. 12 shows an example of measurement window for receiving both a direct beam and a reflected beam.

In order to separate or distinguish the two signals, taking into account the fact that the signals are received with different delays, signal autocorrelation is used. This also allows a determination of the delay for each path. In some embodiments, a measurement window for this RIS beam is larger than what might be used for the normal beams because of additional delay due to reflection. An example is shown in FIG. 12 where a suitable measurement window for the direct path is indicated at 800, a suitable measurement window for the delayed path is indicated at 802, and a combined measurement window is indicated at 804. In some embodiments, measurement window width is signaled to the ED.

In some embodiments, there are multiple reflected beams configured for a single RIS beam. In this case, additional ED behavior includes processing multiple reflections and performing additional measurements, with a suitable measurement window for the reflected beams.

After distinguishing the signals, the ED performs separate processing for each of the signals. This processing may depend on the positioning algorithm used, and may, for example include calculating RSRP and delay, or calculating a power delay profile (PDP).

In some embodiments, the ED calculates its own location based on the measurements taken on the PRS signal as received on the direct and reflected beams. Various algorithms have been described above, and any of these can be employed. The ED may signal its location to the network.

Alternatively, or in addition, the ED transmits signaling to the network containing the measurements taken on the PRS signal for the network to use in computing the location of the ED. The ED feeds back measurements for both the direct beam(s) and reflected beam(s). For the direct beam(s), ED feeds back only one set of measurements (RSRP, delay, etc.). For the reflected beam(s), the ED feeds back one or more sets of measurements.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in a first node comprising:
receiving from another node, by the first node, a first reflected reference signal which is a reference signal after having been reflected by a first reflector which applied a first signature sequence to the reference signal by performing element by element multiplication of the reference signal with the first signature sequence, wherein the first signature sequence applied by the first reflector to the reference signal using the element by element multiplication includes one or more time domain signatures, wherein the element by element multiplication is performed in a time domain;
making, by the first node, a measurement on the first reflected reference signal;
obtaining, by the first node, a location of the first reflector, wherein the obtaining the location of the first reflector comprises processing the first reflected reference signal to determine the first signature sequence, the first signature sequence being associated with the location of the first reflector in a lookup table containing respective locations for a plurality of signature sequences including the first signature sequence, and obtaining the location of the first reflector based on the first signature sequence by looking up the location associated with the first signature sequence in the lookup table to identify the first reflector from a plurality of reflectors; and
determining, by the first node, a location of the first node based on the location of the first reflector and the measurement on the first reflected reference signal.

2. The method of claim 1 further comprising:
receiving, by the first node, a second reflected reference signal which is the reference signal after having been reflected by a second reflector;
making a measurement, by the first node, on the second reflected reference signal;
obtaining, by the first node, a location of the second reflector; and
wherein said determining, by the first node, the location of the first node is based on the location of the first reflector, the measurement on the first reflected reference signal, the location of the second reflector and the measurement on the second reflected reference signal.

3. The method of claim 2, wherein receiving the second reflected reference signal which is the reference signal after having been reflected by the second reflector comprises:
receiving the second reflected reference signal which is the reference signal after having been reflected by the second reflector which applied a second signature sequence to the signal;
wherein obtaining the location of the second reflector comprises processing the second reflected reference signal to determine the second signature sequence, and obtaining the location of the second reflector based on the second signature sequence.

4. The method of claim 1, wherein the reference signal is received from the another node further comprising:
receiving, by the first node, the reference signal directly from the another node;
and the method further comprising:
making a measurement, by the first node, on the reference signal received directly from the another node;
obtaining, by the first node, the location of the another node; and
wherein said determining, by the first node, the location of the first node is based on the location of the first reflector, the measurement on the first reflected reference signal, the location of the another node and the measurement on the reference signal received directly from the another node.

5. The method of claim 4 wherein receiving the reference signal directly from the another node comprises:
receiving the reference signal over at least one beam out of multiple beams from the another node, each beam of the multiple beams received at a respective time period and a respective angle known to the first node.

6. The method of claim 5 wherein:
a particular beam of the multiple beams from the another node is directed towards the first reflector;
receiving the first reflected reference signal after having been reflected by the first reflector comprises receiving the particular beam after having been reflected by the first reflector at the respective time period of the particular beam.

7. The method of claim 5 wherein:
a particular beam of the multiple beams from the other node is directed towards the first reflector over multiple time periods;
receiving the first reflected reference signal after having been reflected by the first reflector comprises receiving the particular beam after having been reflected by the reflector during at least one of the multiple time periods at a respective angle for each of the multiple time periods, the respective angle for each of the multiple time periods known to the first node.

8. The method of claim 1, further comprising:
transmitting, by the first node, the reference signal towards the first reflector.

9. The method of claim 1, wherein the reference signal to which the first reflector applied the first signature sequence by performing element by element multiplication is a time domain signal.

10. An apparatus comprising:
a processor and memory, the apparatus configured to:
receive a first reflected reference signal from another node which is a reference signal after having been reflected by a first reflector which applied a first signature sequence to the reference signal by performing element by element multiplication of the reference signal with the first signature sequence, wherein the first signature sequence applied by the first reflector to the reference signal using the element by element multiplication includes one or more time domain signatures, wherein the element by element multiplication is performed in a time domain;
make a measurement on the first reflected reference signal;
obtain a location of the first reflector, wherein the obtaining the location of the first reflector comprises processing the first reflected reference signal to determine the first signature sequence, the first signature sequence being associated with the location of the first reflector in a lookup table containing respective locations for a plurality of signature sequences including the first signature sequence, and obtaining the location of the first reflector based on the first signature sequence by looking up the location associated with the first signature sequence in the lookup table to identify the first reflector from a plurality of reflectors; and
determine a location of the apparatus based on the location of the first reflector and the measurement on the first reflected reference signal.

11. The apparatus of claim 10 further configured to:
receive a second reflected reference signal which is the reference signal after having been reflected by a second reflector;
make a measurement on the second reflected reference signal;
obtain a location of the second reflector; and
wherein said location determined by the apparatus is also based on the location of the second reflector and the measurement on the second reflected reference signal.

12. The apparatus of claim 11, wherein the apparatus is configured to receive the second reflected reference signal which is the reference signal after having been reflected by the second reflector by:
receiving the second reflected reference signal which is the reference signal after having been reflected by the second reflector which applied a second signature sequence to the signal;
wherein the apparatus is configured to obtain the location of the second reflector by processing the second reflected reference signal to determine the second signature sequence, and obtaining the location of the second reflector based on the second signature sequence.

13. The apparatus of claim 10, further configured to:
receive the reference signal from the another node by receiving the reference signal directly from the another node; and the apparatus further configured to:
make a measurement on the reference signal received directly from the another node;
obtain the location of the another node; and
wherein said location determined by the apparatus is also based on the location of the another node and the measurement on the reference signal received directly from the another node.

14. The apparatus of claim 13 wherein the apparatus is configured to receive the reference signal directly from the another node by:
receiving the reference signal over at least one beam out of multiple beams from the another node, each beam of the multiple beams received at a respective time period and a respective angle known to the apparatus.

15. The apparatus of claim 14 wherein:
a particular beam of the multiple beams from the another the another node is directed towards the first reflector;
the apparatus is configured to receive the first reflected reference signal after having been reflected by the first reflector by receiving the particular beam after having been reflected by the first reflector at the respective time period of the particular beam.

16. The apparatus of claim 14 wherein:
a particular beam of the multiple beams from the other node is directed towards the first reflector over multiple time periods;
the apparatus is configured to receive the first reflected reference signal after having been reflected by the first reflector by receiving the particular beam after having been reflected by the reflector during at least one of the multiple time periods at a respective angle for each of the multiple time periods, the respective angle for each of the multiple time periods known to the apparatus.

17. The apparatus of claim 10, further configured to:
transmit the reference signal towards the first reflector.

18. The apparatus of claim 10, wherein the reference signal to which the first reflector applied the first signature sequence by performing element by element multiplication is a time domain signal.

19. A non-transitory computer readable medium, wherein the non-transitory computer readable storage medium stores an instruction, and when the instruction runs on a computer, the computer performs:
receiving, by a first node from another node, a first reflected reference signal which is a reference signal after having been reflected by a first reflector which applied a first signature sequence to the reference signal by performing element by element multiplication of the reference signal with the first signature sequence, wherein the first signature sequence applied by the first reflector to the reference signal using the element by element multiplication includes one or more time domain signatures, wherein the element by element multiplication is performed in a time domain;
making, by the first node, a measurement on the first reflected reference signal;
obtaining, by the first node, a location of the first reflector, wherein the obtaining the location of the first reflector comprises processing the first reflected reference signal to determine the first signature sequence, the first signature sequence being associated with the location of the first reflector in a lookup table containing respective locations for a plurality of signature sequences including the first signature sequence, and obtaining the location of the first reflector based on the first signature sequence by looking up the location associated with the first signature sequence in the lookup table to identify the first reflector from a plurality of reflectors; and
determining, by the first node, a location of the first node based on the location of the first reflector and the measurement on the first reflected reference signal.

20. The non-transitory computer readable medium according to claim 19, wherein the computer further performs:
  transmitting, by the first node, the reference signal towards the first reflector.

21. The non-transitory computer readable medium according to claim 19, wherein the reference signal to which the first reflector applied the first signature sequence by performing element by element multiplication is a time domain signal.

* * * * *